2,766,255

α-METHYLTRYPTOPHANE AND SALTS THEREOF

Karl Pfister III, Westfield, N. J., and William J. Leanza, Staten Island, N. Y., assignors to Merck & Co., Inc., Rahway, N. J., a corporation of New Jersey No Drawing. Application October 9, 1953,
Serial No. 385,264

9 Claims. (Cl. 260—319)

This invention relates to novel chemical compounds and processes of preparing the same. Specifically, it is concerned with α-methyltryptophane and methods of producing this product.

α-Methyltryptophane, a white crystalline substance, is represented by the following formula

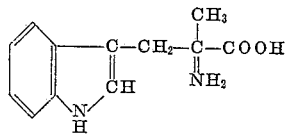

This product crystallizes from water as a hydrate having a melting point of about 203–205° C. α-Methyltryptophane and its salts formed by reaction with bases and acids are useful in the field of chemistry, particularly in the field of medicinal chemistry. Thus, α-methyltryptophane has antiseptic properties and can be used as an antiseptic. The valuable bacteriostatic and bactericidal properties of this compound are illustrated by its activity in vivo against both penicillin sensitive and penicillin resistant strains of M. pyogenes var. aureus. Therefore, α-methyltryptophane as well as its salts may be of value in the treatment of staphylococci infections.

It is an object of the present invention to provide the novel compound, α-methyltryptophane and esters, acyl derivatives and salts thereof. A further object is to provide processes for the preparation of α-methyltryptophane. An additional object is to provide a novel intermediate product useful in the preparation of α-methyltryptophane. Other objects will be apparent from the detailed description of the invention hereinafter provided.

In accordance with this invention, it is now found that α-methyltryptophane is readily prepared by a two step process comprising reacting indolylacetone with an alkali metal cyanide in the presence of ammonium carbonate to produce 5-methyl-5-skatylhydantoin, and hydrolyzing this hydantoin. These reactions may be shown as follows:

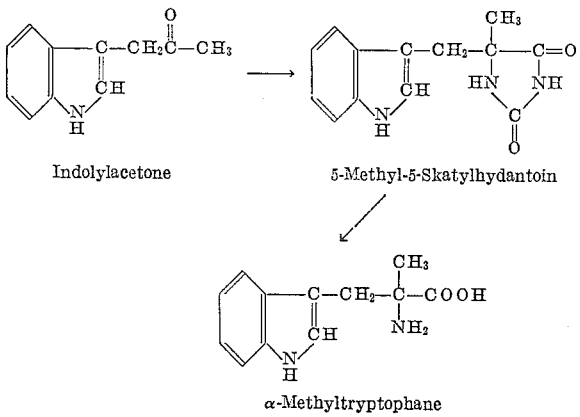

Indolylacetone → 5-Methyl-5-Skatylhydantoin → α-Methyltryptophane

In the first step of our synthesis the starting material, indolylacetone, is reacted with an alkali metal cyanide such as potassium or sodium cyanide, in the presence of ammonium carbonate to produce 5-methyl-5-skatylhydantoin. This reaction is conveniently effected in a suitable solvent for indolylacetone and the cyanide such as an aqueous solution of an alcohol such as methanol or ethanol. Thus, the reaction may be effected by intimately contacting a solution of potassium cyanide in aqueous ethyl alcohol, a solution of indolylacetone in ethyl alcohol, and solid ammonium carbonate and heating the resulting reaction mixture at a temperature of about 50–75° C. for sufficient time to insure completion of the reaction. We usually find that reaction times of about 18–24 hours are sufficient at this temperature. The 5-methyl-5-skatylhydantoin thus prepared is readily recovered by evaporating the mixture to dryness, triturating the resulting residue with a dilute mineral acid, and filtering the resulting triturated mixture. If desired, the product so obtained can be further purified by recrystallization from ethanol.

In the second step of our process, the 5-methyl-5-skatylhydantoin is hydrolyzed to produce α-methyltryptophane. This hydrolysis is conveniently effected by heating the hydantoin with an alkali preferably an alkali metal or alkaline earth metal hydroxide. For example, this hydrolysis is readily carried out by heating the hydantoin with a solution of barium hydroxide under reflux for about 16 hours. The α-methyltryptophane thus formed may be obtained by acidifying the resulting hydrolysate, and recovering the product in accordance with methods well known in the art.

Salts of α-methyltryptophane can be prepared by reacting this product with a base or an inorganic acid as will be readily apparent to those skilled in the art. For example, by reacting α-methyltryptophane with potassium hydroxide or calcium hydroxide the potassium or calcium salts are obtained. By reacting α-methyltryptophane with inorganic acids the corresponding acid addition salts of this product are obtained. Other useful derivatives of α-methyltryptophane such as esters and acyl derivatives are readily prepared in accordance with methods known in the art. Thus, esters are obtained by heating this acid with an alcohol in the presence of a small amount of a mineral acid. Acyl derivatives are conveniently produced by heating the acid with an acylating agent such as an organic acid anhydride or acid halide.

The following examples are presented as illustrative embodiments of our invention.

EXAMPLE 1

A solution of 3 g. of potassium cyanide in 50 ml. of 50% alcohol was mixed with a solution of 4 g. of indolylacetone in 150 ml. of 80% alcohol. After the addition of 15 g. of solid ammonium carbonate, the mixture was heated at 58–60° C. under an air condenser for 24 hours. The condenser was then removed and the solution allowed to evaporate on the steam bath overnight. The residue was stirred with a little dilute hydrochloric acid, cooled and filtered, and the product 5-methyl-5-skatylhydantoin, recrystallized from alcohol. Yield 3.8 g., 1st crop, M. P. 227–229° C.; 1.2 g., 2nd crop, M. P. 227–229° C.

A sample was recrystallized from aqueous alcohol, M. P. 232–233° C.

Analysis.—Calcd. for $C_{13}H_{13}N_3O_2$: C, 64.19; H, 5.39. Found: C, 64.34; H, 5.27.

A solution of 4.5 g. of 5-methyl-5-skatylhydantoin and 7 g. of sodium hydroxide in 100 ml. of water was refluxed for 22 hours. After acidification of the resulting solution containing the sodium salt of α-methyltryptophane to pH 8.7 with acetic acid, the solution was filtered to remove silica, and the filtrate neutralized to litmus. It was then concentrated to a syrup and 100 ml. of absolute alcohol was added. The precipitated sodium acetate was removed and the solution again concentrated. The residue was dissolved in butanol and the product partly precipitated by the addition of ether. The amorphous precipitate was collected and dried, and when mixed with a little water gave crystals of α-methyltryptophane hydrate. The butanol-ether solution was completely evaporated and the residue dissolved in 15 ml. of water. This solution was seeded, cooled, and the product collected. Yield 1.5 g. A sample of α-methyltryptophane recrystallized from water, melted at 203–205° C.

Analysis.—Calcd. for $C_{12}H_{14}N_2O_2 \cdot H_2O$: C, 61.00; H, 6.83; N, 11.86. Found: C, 61.17; H, 6.56; N, 11.91.

In another experiment, 22 g. of the hydantoin was refluxed overnight with 250 g. of barium hydroxide in 600 ml. of water to form the barium salt of α-methyltryptophane. The excess barium was precipitated with a stream of $CO_2$ and the suspension filtered. Dilute sulfuric acid was added to the filtrate in portions until further addition failed to cause turbidity (pH ca. 6). The solution was charcoaled, filtered, and the filtrate concentrated under diminished pressure to about 200 ml. as the α-methyltryptophane hydrate crystallized out. Yield 13 g. first crop, M. P. 202–203° C. On concentrating the filtrate to about 15 ml., a second crop of 4.0 g. was obtained.

EXAMPLE 2

*N-acetyl α-methyltryptophane*

Acetic anhydride (0.6 cc.) was gradually added to an alkaline solution of α-methyltryptophane (0.2 g.) at about 27° C. with mechanical stirring. The reaction mixture was then warmed to 35–40° C. for two hours followed by refrigeration (5° C.) overnight. The white crystalline precipitate was collected by filtration, washed with a small amount of dilute hydrochloric acid and then washed free of chloride ion with water. The substantially pure N-acetyl α-methyltryptophane thus obtained weighed 135 mg. and had a decomposition point of 211–213.5° C.

EXAMPLE 3

*α-Methyltryptophane hydrochloride*

Fifty milligrams of α-methyltryptophane was reacted with two ml. of 2.5 N hydrochloric acid. The resulting solution was clarified by filtration and allowed to evaporate to dryness at room temperature (about 27° C.) The residue was dissolved in ethanol and the resulting solution diluted with ether to precipitate the white solid product. The hydrochloride readily liquified on exposure to air.

EXAMPLE 4

*Anhydrous α-methyltryptophane*

A sample of α-methyltryptophane which had been recrystallized from water and air dried at room temperature to constant weight was dried at 100° C. in vacuo to constant weight (about two hours). Weight-loss on drying was 7.6%. (Theory for 1 mole of water equals 7.6%.)

Analysis.—Calc'd: $C_{12}H_{14}N_2O_2$—C, 66.0; H, 6.5; N, 12.9. Found: C, 65.87; H, 6.51; N, 12.54.

This anhydrous sample was then exposed to the air until it again reached a constant weight. Weight-uptake was 7.82% indicating that α-methyltryptophane forms a relatively stable monohydrate.

Various changes and modifications in the procedures herein disclosed will occur to those skilled in the art, and to the extent that such changes and modifications are embraced by the appended claims, it is to be understood that they constitute part of our invention.

We claim:

1. A compound from the group consisting of α-methyltryptophane, alkali metal salts of α-methyltryptophane, alkaline earth metal salts of α-methyltryptophane and mineral acid salts of α-methyltryptophane.
2. α-Methyltryptophane.
3. The sodium salt of α-methyltryptophane.
4. The barium salt of α-methyltryptophane.
5. α-Methyltryptophane hydrochloride.
6. The process which comprises intimately contacting indolylacetone with an alkali metal cyanide and ammonium carbonate to produce 5-methyl-5-skatylhydantoin, and hydrolyzing said hydantoin to produce α-methyltryptophane.
7. The process which comprises intimately contacting indolylacetone with potassium cyanide and ammonium carbonate to produce 5-methyl-5-skatylhydantoin, and reacting said hydantoin with a base to produce α-methyltryptophane.
8. The process which comprises intimately contacting indolylacetone with potassium cyanide and ammonium carbonate to produce 5-methyl-5-skatylhydantoin, and reacting said hydantoin with sodium hydroxide to produce α-methyltryptophane.
9. The process which comprises intimately contacting indolylacetone with potassium cyanide and ammonium carbonate to produce 5-methyl-5-skatylhydantoin, and reacting said hydantoin by heating with barium hydroxide to produce α-methyltryptophane.

References Cited in the file of this patent

UNITED STATES PATENTS

| | | |
|---|---|---|
| 2,527,366 | Livak | Oct. 24, 1950 |
| 2,557,920 | White | June 19, 1951 |

OTHER REFERENCES

Hegedus: Helv. Chim. Acta 29, 1499–1507 (1946).
Miller et al.: Jour. Chem. Soc. 1938, 1910–12.
Rydon: Jour. Chem. Soc. 1948, 705–10 (1948).